(12) United States Patent
Darmour

(10) Patent No.: US 12,222,215 B2
(45) Date of Patent: Feb. 11, 2025

(54) PERSPECTIVE-PRESERVING SEAMLESS APPLICATION SWITCHING

(71) Applicant: Oracle International Corporation, Redwood Shores, CA (US)

(72) Inventor: Jennifer Darmour, Seattle, WA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/400,652

(22) Filed: Dec. 29, 2023

(65) Prior Publication Data

US 2024/0133705 A1 Apr. 25, 2024

Related U.S. Application Data

(63) Continuation of application No. 17/321,204, filed on May 14, 2021, now Pat. No. 11,892,313.

(60) Provisional application No. 63/080,461, filed on Sep. 18, 2020.

(51) Int. Cl.
*G01C 21/36* (2006.01)
*G06N 20/00* (2019.01)

(52) U.S. Cl.
CPC ....... *G01C 21/367* (2013.01); *G01C 21/3697* (2013.01); *G06N 20/00* (2019.01)

(58) Field of Classification Search
CPC ... G01C 21/367; G01C 21/3697; G06N 20/00
USPC ....................................................... 701/455
See application file for complete search history.

(56) References Cited

U.S. PATENT DOCUMENTS

| 8,490,025 | B2 | 7/2013 | Jakobson et al. |
| 8,607,167 | B2 | 12/2013 | Matas et al. |
| 10,191,641 | B2 | 1/2019 | Chen et al. |
| 10,645,294 | B1 | 5/2020 | Manzari et al. |
| 11,262,905 | B2 | 3/2022 | Chen et al. |
| 2011/0316884 | A1* | 12/2011 | Giambalvo ............... G06T 3/40 345/660 |

(Continued)

FOREIGN PATENT DOCUMENTS

| CA | 2821864 A1 * | 2/2014 | ............ G06F 3/041 |
| GB | 2516472 A | 1/2015 | |

(Continued)

*Primary Examiner* — Tuan C To
(74) *Attorney, Agent, or Firm* — Invoke

(57) ABSTRACT

Techniques for perspective-preserving seamless application switching are disclosed. A system may display a first interface using a first application. The first interface includes interface elements representing a plurality of objects. The system may detect a zoom-in command, received by the first application, requesting a particular zoom level for a first interface element, corresponding to a first object in the first plurality of objects. The system may determine that the requested zoom level exceeds a threshold. Responsive to determining that the requested zoom level exceeds the threshold, the system may display, using a second application, a second interface corresponding to the first object. The second interface may include one or more of: (a) characteristics associated with the first object that were not displayed by the first application, or (b) user input elements for executing operations associated with the first object that were not displayed by the first application.

20 Claims, 7 Drawing Sheets

(56) References Cited

U.S. PATENT DOCUMENTS

| | | | |
|---|---|---|---|
| 2014/0047380 A1* | 2/2014 | Mak | G06F 3/041 |
| | | | 715/800 |
| 2014/0359537 A1* | 12/2014 | Jackobson | G01C 21/3697 |
| | | | 715/855 |
| 2016/0253982 A1* | 9/2016 | Cheung | G06F 3/0484 |
| | | | 715/789 |
| 2017/0276505 A1 | 9/2017 | Duggan | |
| 2018/0005454 A1 | 1/2018 | Suni et al. | |
| 2018/0300034 A1 | 10/2018 | Taylor | |
| 2018/0349413 A1 | 12/2018 | Shelby et al. | |

FOREIGN PATENT DOCUMENTS

| | | | | |
|---|---|---|---|---|
| WO | WO-2009053833 A1 * | 4/2009 | | G06F 3/0481 |
| WO | 2011/163427 A2 | 12/2011 | | |

* cited by examiner

PERSPECTIVE-PRESERVING SEAMLESS APPLICATION SWITCHING

INCORPORATION BY REFERENCE; DISCLAIMER

Each of the following applications are hereby incorporated by reference: application Ser. No. 17/321,204 filed on May 14, 2021; Application No. 63/080,461 filed on Sep. 18, 2020. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to switching applications to present different types of information or different command sets in relation to a same object(s).

BACKGROUND

Often a system managed by a single user includes multiple components, each component having separate applications used for managing and/or accessing the functionality of the component. The user must switch between different applications to access different functionalities of the various components. Switching applications may be cumbersome and requires a user to manually switch contexts and locate the component in a new application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. PERSPECTIVE-PRESERVING APPLICATION SWITCHING
4. EXAMPLE EMBODIMENT
5. MISCELLANEOUS; EXTENSIONS
6. HARDWARE OVERVIEW

1. General Overview

Different applications may present different information about an object, and/or provide different functionality in relation to the object. As an example, a map application may display a location of a warehouse on a map. A warehouse management application may display details including, for example, the current set of trucks loading/unloading at the warehouse or an inventory of the warehouse.

One or more embodiments seamlessly switch between different applications while maintaining a perspective such as a focus on a particular object. In the above example, the system switches from displaying an interface generated by the map application to an interface displayed by the warehouse management application. The switch between applications may be triggered, for example, in response to zooming in or out. The map application may initially show multiple streets and buildings including the warehouse. When the system receives user input that zooms in on the warehouse, the system increases the size of the warehouse within the map application. However, when the system receives further user input that zooms in beyond a threshold zoom level, the system switches from displaying (a) the map generated by the map application to displaying (b) a warehouse management interface generated by the warehouse application. The warehouse management interface may present about the warehouse and accept commands for management of the warehouse. When the user zooms out, the system may switch from the warehouse management application back to the map application.

One or more embodiments select a new application for seamless switching based on the target object. As an example, when the system detects user input zooming in a tourist destination, the system may display information corresponding to the tourist destination presented by a travel-centric application. The information may be displayed within an interface generated by the travel-centric application.

One or more embodiments described in this Specification and/or recited in the claims may not be included in this General Overview section.

2. Architectural Overview

Figure 1:
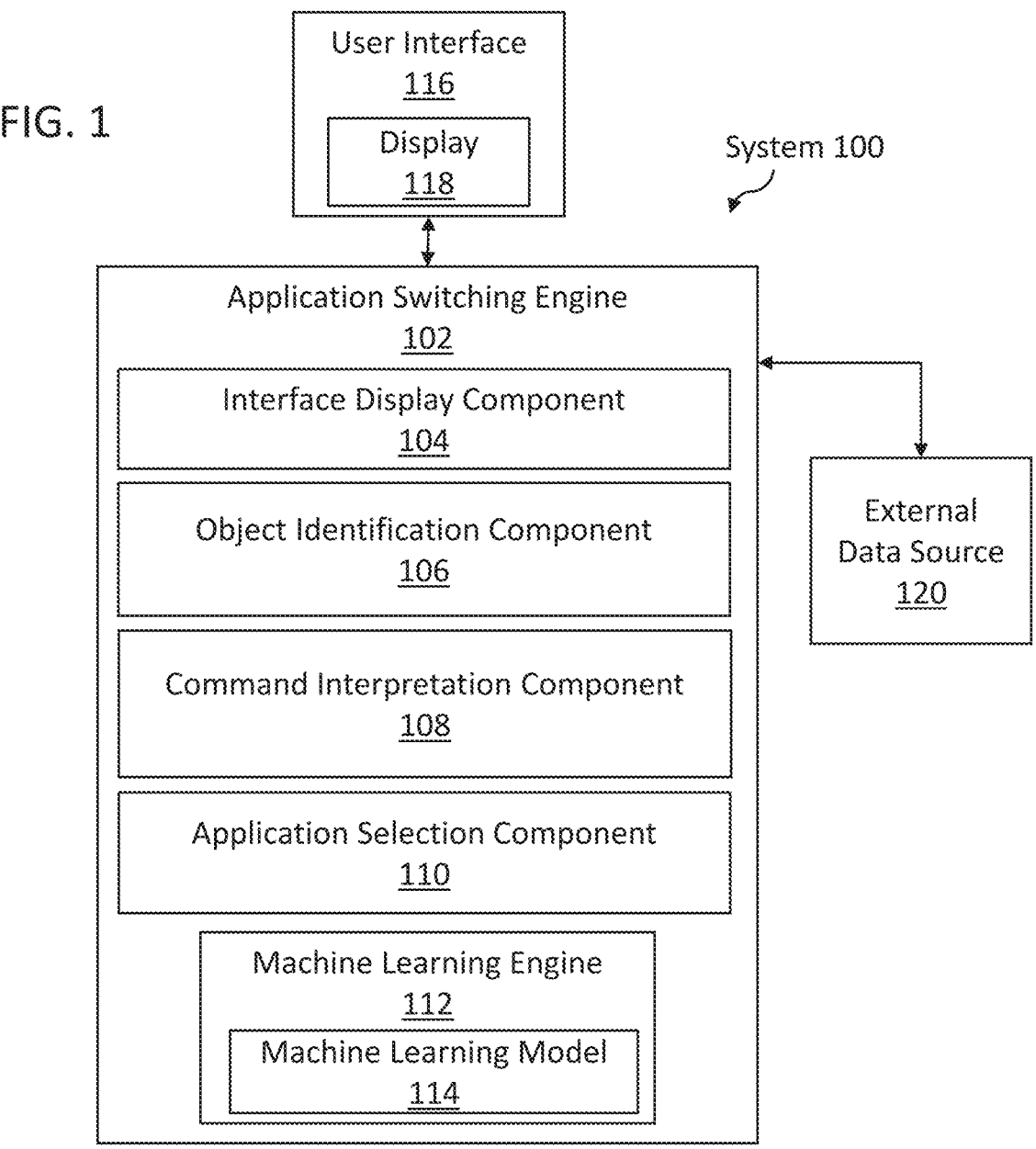
FIG. 1 illustrates a system for perspective-preserving application switching in accordance with one or more embodiments.

FIG. 1 illustrates a system 100 for perspective-preserving seamless application switching in accordance with one or more embodiments. As illustrated in FIG. 1, system 100 includes an application switching engine 102, a user interface 116, an external data source 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user interface 116 refers to hardware and/or software configured to facilitate communications between a user and the application switching engine 102. The user interface 116 may be used by a user who accesses an interface (e.g., a dashboard interface) for work and/or personal activities. The user interface 116 may be associated with one or more devices for presenting visual media, such as a display 118, including a monitor, a television, a projector, and/or the like. User interface 116 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface 116 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 116 is specified in one or more other languages, such as Java, C, or C++.

In one or more embodiments, the application switching engine 102 refers to hardware and/or software configured to perform operations described herein for seamlessly switching between application interfaces displayed to a user. Examples of operations for selecting query results to display to a user are described below with reference to FIG. 2.

In an embodiment, the application switching engine 102 includes an interface display component 104. An interface display component 104 may refer to hardware and/or software configured to perform operations described herein (including such operations as may be incorporated by reference) for displaying an application interface to a user.

In an embodiment, the application switching engine 102 includes an object identification component 106. An object identification component 106 may refer to hardware and/or software configured to identify characteristics of an object associated with a displayed interface element.

In an embodiment, the application switching engine 102 includes a command interpretation component 108. A command interpretation component 108 may refer to hardware and/or software configured to receive and interpret commands received from the user.

In an embodiment, the application switching engine 102 includes an application selection component 110. An application selection component 110 may refer to hardware and/or software configured to select an application for display to a user.

In an embodiment, one or more components of the application switching engine 102 use a machine learning engine 112. Machine learning includes various techniques in the field of artificial intelligence that deal with computer-implemented, user-independent processes for solving problems that have variable inputs.

In some embodiments, the machine learning engine 112 trains a machine learning model 114 to perform one or more operations. Training a machine learning model 114 uses training data to generate a function that, given one or more inputs to the machine learning model 114, computes a corresponding output. The output may correspond to a prediction based on prior machine learning. In an embodiment, the output includes a label, classification, and/or categorization assigned to the provided input(s). The machine learning model 114 corresponds to a learned model for performing the desired operation(s) (e.g., labeling, classifying, and/or categorizing inputs). An application switching engine 102 may use multiple machine learning engines 112 and/or multiple machine learning models 114 for different purposes.

In an embodiment, the machine learning engine 112 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 112 receives positive and/or negative reinforcement in the process of attempting to solve a particular problem (e.g., to optimize performance in a particular scenario, according to one or more predefined performance criteria). In an embodiment, the machine learning engine 112 initially uses supervised learning to train the machine learning model 114 and then uses unsupervised learning to update the machine learning model 114 on an ongoing basis.

In an embodiment, a machine learning engine 112 may use many different techniques to label, classify, and/or categorize inputs. A machine learning engine 112 may transform inputs into feature vectors that describe one or more properties ("features") of the inputs. The machine learning engine 112 may label, classify, and/or categorize the inputs based on the feature vectors. Alternatively or additionally, a machine learning engine 112 may use clustering (also referred to as cluster analysis) to identify commonalities in the inputs. The machine learning engine 112 may group (i.e., cluster) the inputs based on those commonalities. The machine learning engine 112 may use hierarchical clustering, k-means clustering, and/or another clustering method or combination thereof. In an embodiment, a machine learning engine 112 includes an artificial neural network. An artificial neural network includes multiple nodes (also referred to as artificial neurons) and edges between nodes. Edges may be associated with corresponding weights that represent the strengths of connections between nodes, which the machine learning engine 112 adjusts as machine learning proceeds. Alternatively or additionally, a machine learning engine 112 may include a support vector machine. A support vector machine represents inputs as vectors. The machine learning engine 112 may label, classify, and/or categorizes inputs based on the vectors. Alternatively or additionally, the machine learning engine 112 may use a naïve Bayes classifier to label, classify, and/or categorize inputs. Alternatively or additionally, given a particular input, a machine learning model may apply a decision tree to predict an output for the given input. Alternatively or additionally, a machine learning engine 112 may apply fuzzy logic in situations where labeling, classifying, and/or categorizing an input among a fixed set of mutually exclusive options is impossible or impractical. The aforementioned machine learning model 114 and techniques are discussed for exemplary purposes only and should not be construed as limiting one or more embodiments.

In an embodiment, the machine learning model may be trained to determine a particular application, of a plurality of applications, for use in displaying an interface to a user. For example, the machine learning model may be trained based on application historically used for opening and/or interacting with a particular object and/or class of objects, and may select an application for opening and/or interacting based on the historical data.

In an embodiment, as a machine learning engine 112 applies different inputs to a machine learning model 114, the corresponding outputs are not always accurate. As an example, the machine learning engine 112 may use supervised learning to train a machine learning model 114. After training the machine learning model 114, if a subsequent input is identical to an input that was included in labeled training data and the output is identical to the supervisory signal in the training data, then output is certain to be accurate. If an input is different from inputs that were included in labeled training data, then the machine learning engine 112 may generate a corresponding output that is inaccurate or of uncertain accuracy. In addition to producing a particular output for a given input, the machine learning engine 112 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, the application switching engine 102 is configured to receive data from one or more external data sources 120. An external data source 120 refers to hardware and/or software operating independent of the application switching engine 102. For example, the hardware and/or software of the external data source 120 may be under control of a different entity (e.g., a different company or other kind of organization) than an entity that controls the application switching engine 102. An external data source 120 may supply data associated with one or more applications. An example of an external data source 120 supplying data to the application switching engine 102 may include a third party database. Many different kinds of external data sources 120 may supply many different kinds of data.

In an embodiment, application switching engine 102 is configured to retrieve data from an external data source 120 by 'pulling' the data via an application programming interface (API) of the external data source 120, using user credentials that a user has provided for that particular external data source 120. Alternatively or additionally, an external data source 120 may be configured to 'push' data to the application switching engine 102 via an API of the query suggestion service, using an access key, password, and/or other kind of credential that a user has supplied to the external data source 120. The application switching engine 102 may be configured to receive data from an external data source 120 in many different ways.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Perspective-Preserving Application Switching

Figure 2:
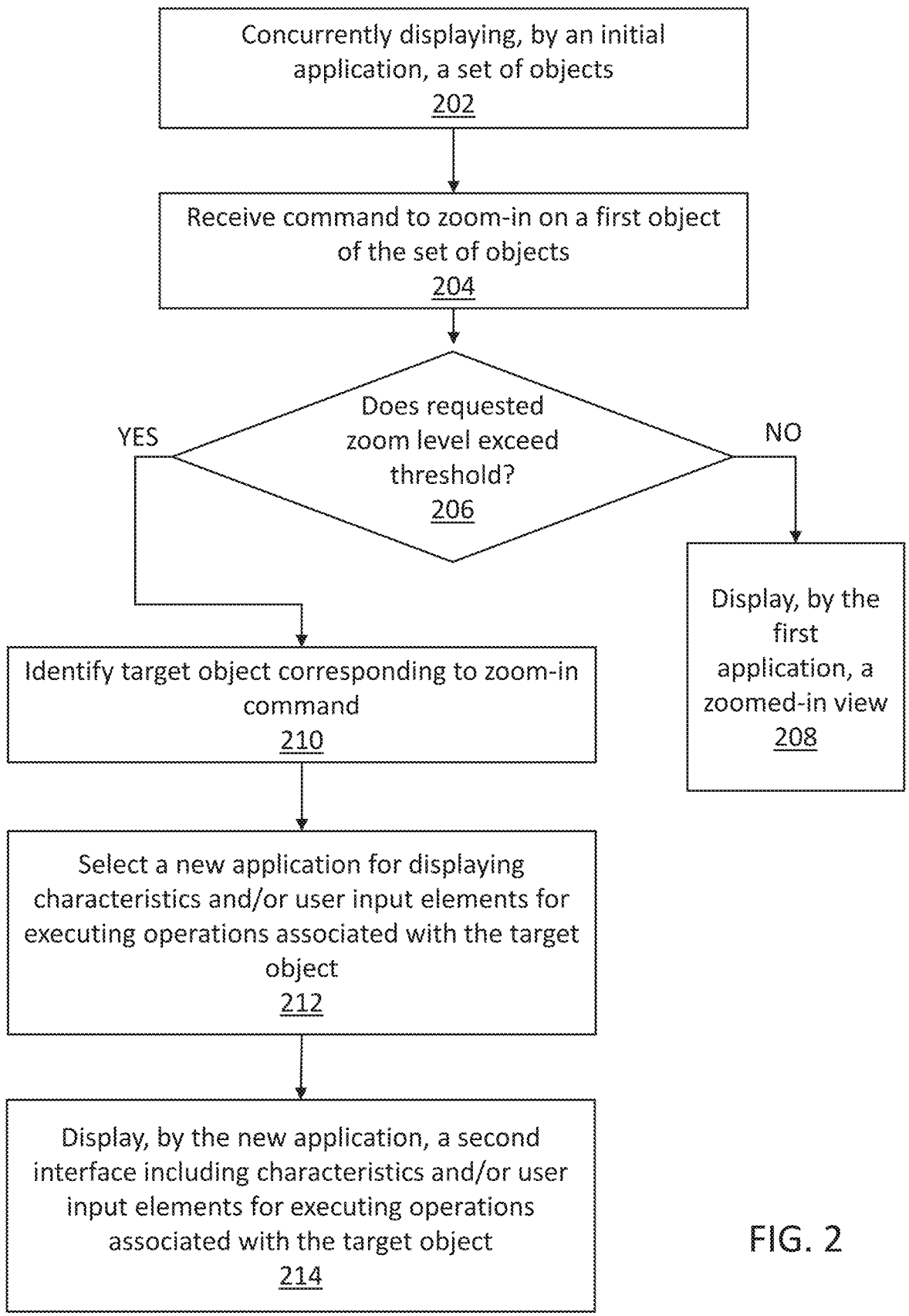
FIG. 2 illustrates an example set of operations for perspective-preserving application switching in accordance with one or more embodiments.

FIG. 2 illustrates an example set of operations for perspective-preserving seamless application switching in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system (e.g., one or more components of system 100 illustrated in FIG. 1) can display an interface including a set of objects (Operation 202). The interface may be generated and displayed by an initial application. The first set of objects may be displayed in many contexts, including, for example, a geographical map, a functional chart, such as a flow chart, a Gantt chart, an organizational chart. There are many ways to display a set of objects that provide the set of objects with some context. In embodiments, the initial application used to display the set of objects may be selected from a plurality of applications. The selected application may be an application that allows a user to execute operations and/or provide input associated with a one or more (e.g., all or substantially all) of the displayed objects. As a particular example, the initial application may be a network logistics application showing all objects located within a network accessible by the user.

In embodiments, each object may be associated with one or more types. For example, a warehouse object may be associated with a warehouse type and a truck object may be associated with a truck type. There are many object types that may be used.

In embodiments, the user may navigate the interface using navigational commands. For example, the user may pan through the set of objects as though the objects were on a physical map or chart, as is known in the art. Additionally, the user may zoom in and/or out on the set of objects.

The system may receive a command causing the interface to zoom in or out on a particular subset of the set of objects (Operation 204). The command to zoom in or out may specify a particular zoom level associated with the zoom. In embodiments, the zoom level may be specified, for example, as a multiplier of a native size of the set being displayed (e.g., 0.25×, 0.5×, 2×, 3×, 4×, etc.) or as a percentage of the native size of the set being displayed (e.g., 25%, 50%, 200%, 300%, 400%, etc.).

The system may determine if the requested zoom level exceeds a threshold value (Operation 206). For example, the threshold may be based on one or more of a size of the object, a size of the display, and/or a number of objects presented on the display. There are many different factors that can be used to determine the threshold.

If the requested zoom level does not exceed the threshold (NO in Operation 206), the system may use the initial application to display a zoomed version of the set of objects, as requested by the request to zoom in or out (Operation 208). Displaying the zoomed version of the set of objects may comprise displaying a subset of the set of objects, based on zoom level and display size and resolution.

If the requested zoom level exceeds the threshold (YES in Operation 206), the system may identify a target object associated with the zoom command (Operation 210). The target object may be identified based on, for example, an object maintained in the display after the requested zoom operation.

The system may select a new application for displaying object characteristics and/or user input elements for executing operations associated with the identified object (Operation 212). The new application may be selected the plurality of applications.

In some embodiments, the new application may be selected based at least in part on one or more attributes of the determined object. For example, the new application may be selected based on an object type associated with the object (e.g., a warehouse object, a truck object, etc.), an object name associated with the object (e.g., a specific object may have a corresponding application used for displaying characteristics of the specific object and/or allowing for input of commands to execute operations associated with the specific object).

In some embodiments, the new application may be selected at least in part based on attributes associated with the user. For example, the user may be in a particular mode (e.g., a view-only mode), so the new application is selected as an application that allows for only viewing characteristics of the identified object.

The system may display a second interface via the selected new application (Operation 214). The second interface generated by the new application may preserve the perspective of the first interface generated by the initial application. As an example, immediately prior to switching applications, the first application may be presenting information related to or otherwise focused on a particular object. The new application may present information for the same particular object, thereby preserving the perspective. The particular object may be identified in a message from the initial application to the new application, or from a management application to the new application. In an embodiment, an API call for the new application may include an identification of the particular object. Preserving the perspective may further include a same set of controls being used to trigger application switches. As an example, a zoom in/zoom out buttons may be presented or overlaid on both the initial application and the new application. Zooming in via an interface presented by the initial application may trigger switching to the new application. Zooming out from an interface presented by the new application may trigger switching back to the initial application.

The second interface, generated by the new application, may be limited to interacting with to the identified object. That is, the second interface does not include any characteristics or user input elements associated with objects, of the set of objects, other than the identified object. In embodiments, the second interface includes one or more of: characteristics associated with the identified object, or user input elements for executing operations associated with the identified object. In some embodiments, the characteristics and/or user input elements displayed via the new application are characteristics and/or user interface elements that were not displayed by the initial application.

In some embodiments, displaying the second interface via the new application may include the initial application transferring control to the new application so that the new application can cause the second interface to be displayed. The control may be transferred directly from the initial application to the new application via direct communication between the two applications. The control may be transferred via communication with a management application.

Alternatively, the system may rely on a management application for managing the displaying of various interfaces. Displaying the second interface via the new application may include the management application displaying the second interface generated by the new application overlaid on top of the first interface generated by the initial application. In some embodiments, the second interface completely covers the first interface, such that the first interface is no longer visible. Alternatively, the second interface may partially cover the first interface, such that at least a portion of the first interface remains visible.

In some embodiments, displaying the second interface via the new application may include the management application concurrently displaying both the second interface generated by the new application and the first interface generated by the initial application. For example, in a windowed system, the management application may display a first window including the first interface generated by the initial application and a second window including the second interface generated by the new application.

In embodiments, it may be possible for the system to revert from the second interface provided by the new application to the first interface provided by the initial application. That is, the system may receive, via the second interface, a second zoom command requesting to zoom out (e.g., a zoom level less than 100%) while displaying the second interface. Responsive to receiving the zoom out command, the system may display, using the initial application, the first interface comprising the set of objects.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
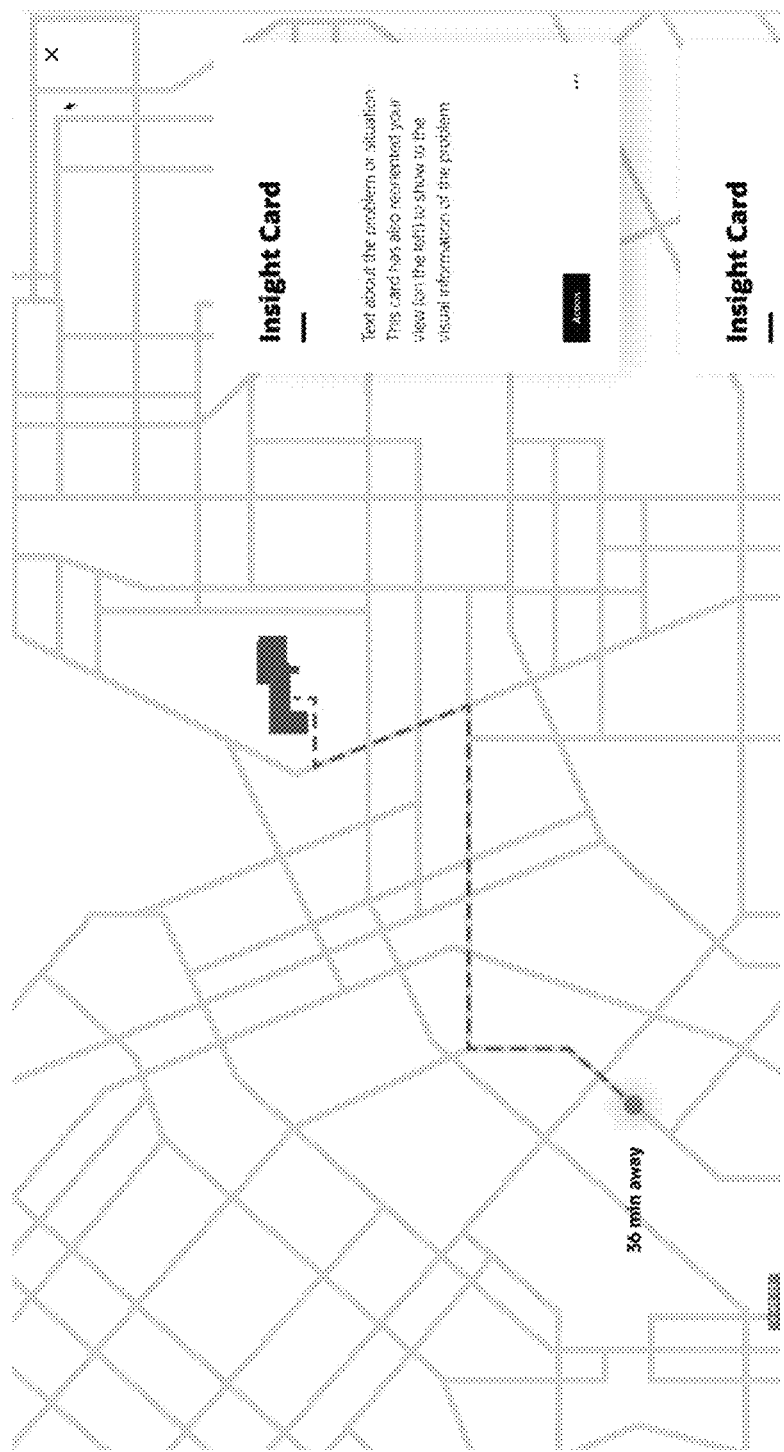
FIGS. 3A-3D show examples of perspective-preserving application switching in accordance with one or more embodiments.

FIGS. 3A-3D illustrate particular examples in accordance with the one or more embodiments. As illustrated in FIG. 3A, the system displays, via an initial application (e.g., a network logistics application) a geographical map that includes a warehouse object and a truck object, in addition to geographical features such as roads.

Figure 3B:
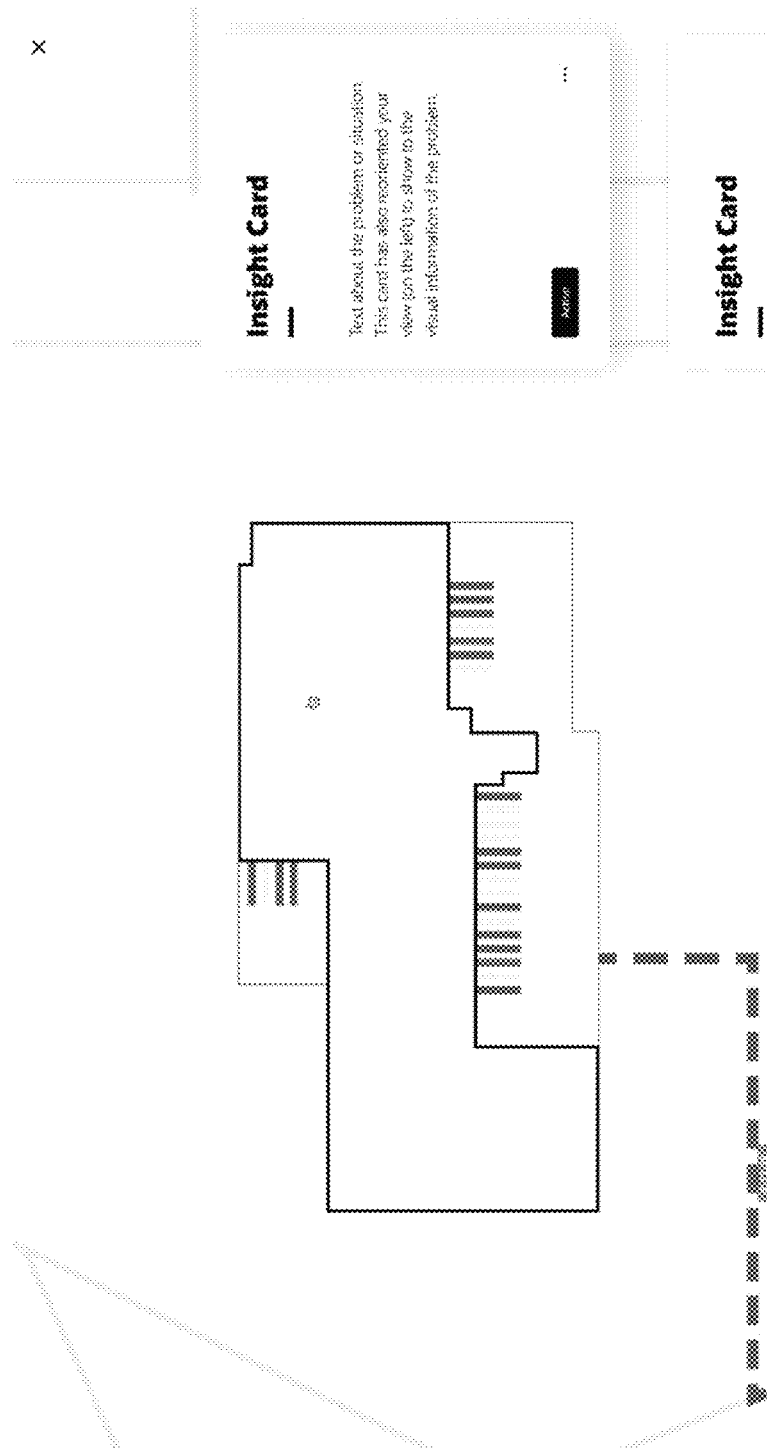

As shown in FIG. 3B, responsive to a zoom-in command from the user focusing on the warehouse object, the system displays a second interface using a new application (e.g., a warehouse management application). The warehouse management application visualizes attributes associated with the warehouse, including detail about the trucks at the warehouse, warehouse bays, current inventory, aisles, etc.

Figure 3C:
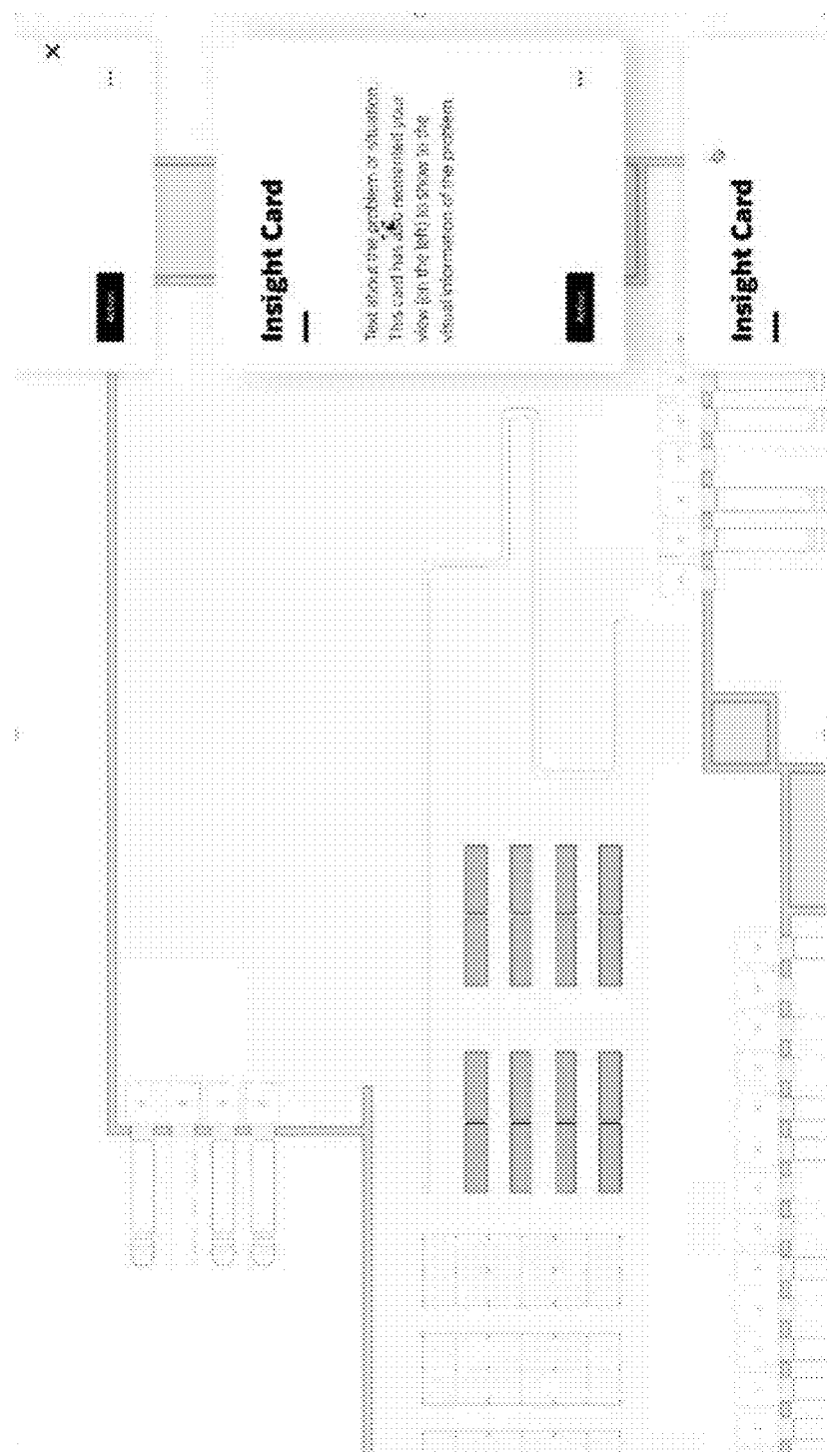
Figure 3D:
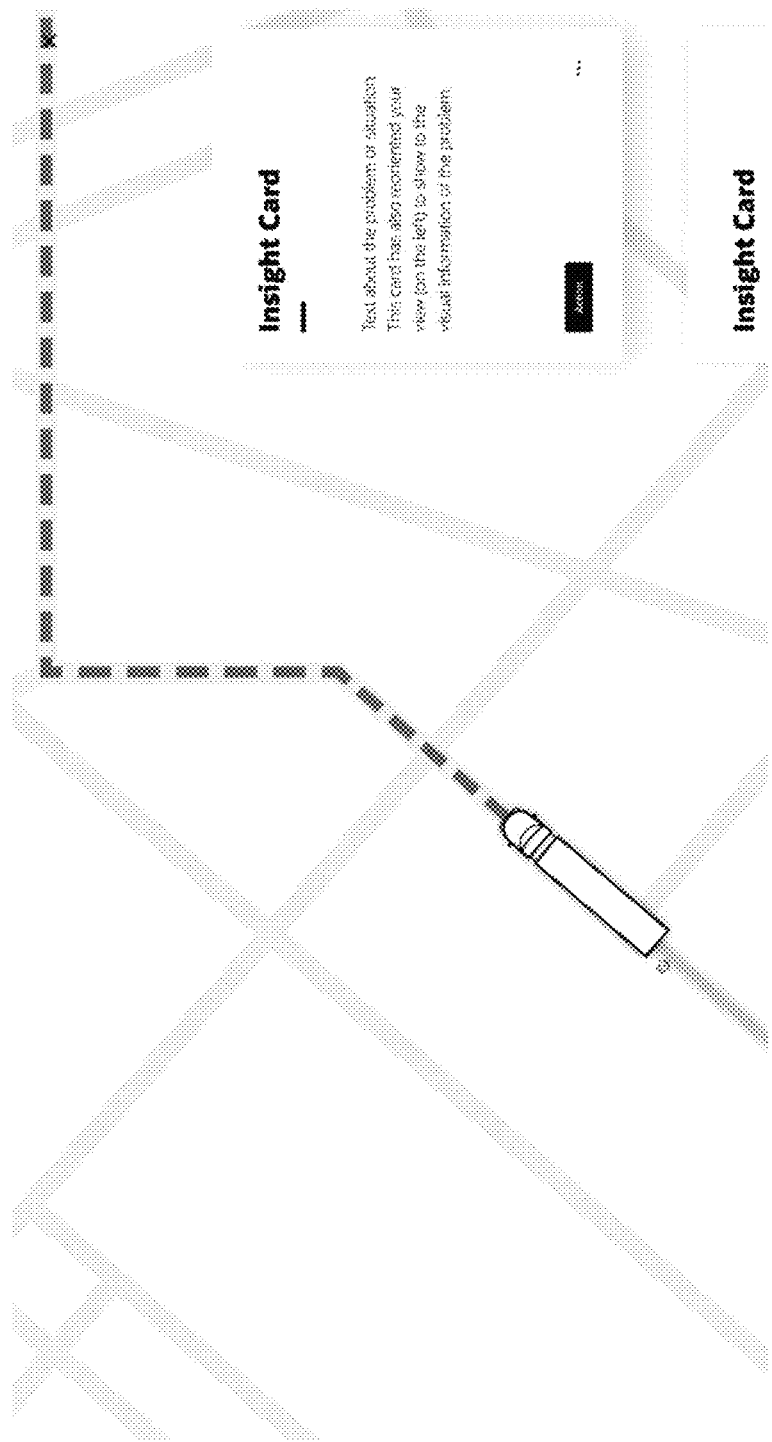

FIG. 3C shows a view of a particular subcomponent of the warehouse. In particular, the user, further zooms in on the warehouse, and a third application (e.g., an inventory management application) shows information related to inventory located within a particular portion of the warehouse.

Returning now to the first interface shown in FIG. 3A, responsive to a user providing a zoom-in command to zoom in on the truck object, the system may display a fourth interface generated by a fourth application (e.g., a transportation management application) used to manage trucks. Accordingly, the user is able to seamlessly transition between multiple applications without the need for jarring and ponderous shifts in perspective.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
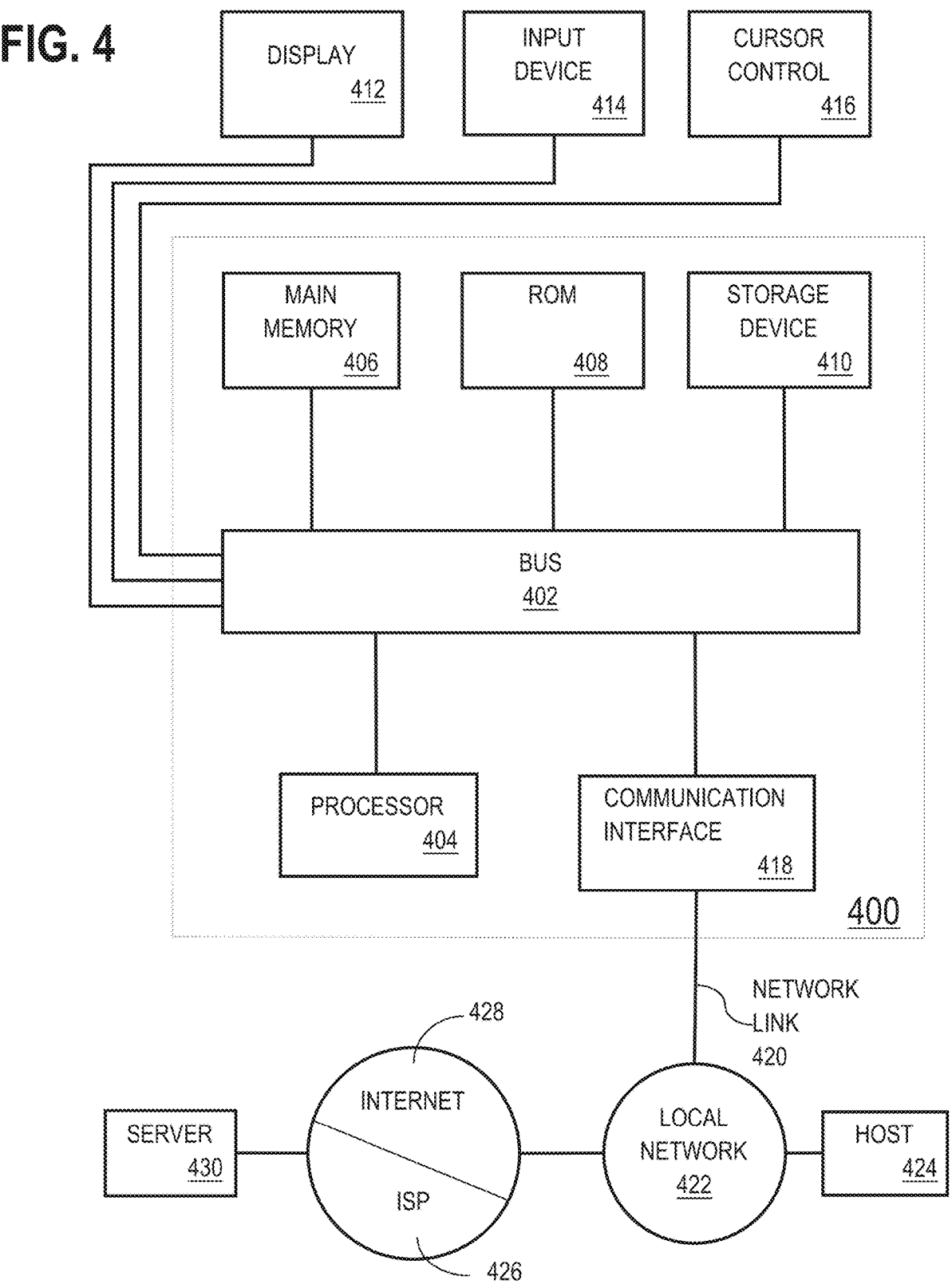
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause performance of operations comprising:

displaying, by a first application, a first interface comprising a first interface element corresponding to a first object in a plurality of objects;

detecting a zoom-out command, received by the first application, requesting a zoom level for the first interface element;

determining that the requested zoom level is less than a threshold;

responsive to determining that the requested zoom level is less than the threshold:

displaying, by a second application, a second interface comprising a plurality of interface elements respectively representing the plurality of objects;

wherein at least one interface element in the plurality of interface elements was not displayed by the first application.

2. The one or more non-transitory computer-readable media of claim 1, wherein the first interface does not comprise any characteristics or user input elements associated with objects, in the plurality of objects, other than the first object.

3. The one or more non-transitory computer-readable media of claim 1, the operations further comprising:

detecting a zoom-in command, received by the second application, to zoom in on a second interface element corresponding to a second object in the plurality of objects;

determining that the zoom-in command exceeds the threshold;

responsive to determining that the zoom-in command exceeds the threshold:

displaying, by a third application, a third interface corresponding to the second object, the third application being different than the first application.

4. The one or more non-transitory computer-readable media of claim 3, the operations further comprising:

prior to the third application displaying the third interface, selecting the third application, from a plurality of applications, based on an object type of the second object.

5. The one or more non-transitory computer-readable media of claim 3, wherein displaying the third interface by the third application comprises: a management application displaying (a) the third interface generated by the third application overlaid on top of (b) the second interface generated by the second application.

6. The one or more non-transitory computer-readable media of claim 1, wherein displaying the second interface by the second application comprises: a management application concurrently displaying (a) the second interface generated by the second application with (b) the first interface generated by the first application.

7. The one or more non-transitory computer-readable media of claim 1, wherein displaying the second interface by the second application comprises: the first application transferring control to the second application.

8. A system comprising:

one or more hardware processors;

one or more non-transitory computer-readable media; and program instructions stored on the one or more non-transitory computer readable media which, when executed by the one or more hardware processors, cause the system to perform operations comprising:

displaying, by a first application, a first interface comprising a first interface element corresponding to a first object in a plurality of objects;

detecting a zoom-out command, received by the first application, requesting a zoom level for the first interface element;

determining that the requested zoom level is less than a threshold;

responsive to determining that the requested zoom level is less than the threshold:

displaying, by a second application, a second interface comprising a plurality of interface elements respectively representing the plurality of objects;

wherein at least one interface element in the plurality of interface elements was not displayed by the first application.

9. The system of claim 8, wherein the first interface does not comprise any characteristics or user input elements associated with objects, in the plurality of objects, other than the first object.

10. The system of claim 8, the operations further comprising:
    detecting a zoom-in command, received by the second application, to zoom in on a second interface element corresponding to a second object in the plurality of objects;
    determining that the zoom-in command exceeds the threshold;
    responsive to determining that the zoom-in command exceeds the threshold:
    displaying, by a third application, a third interface corresponding to the second object, the third application being different than the first application.

11. The system of claim 10, the operations further comprising:
    prior to the third application displaying the third interface, selecting the third application, from a plurality of applications, based on an object type of the second object.

12. The system of claim 10, wherein displaying the third interface by the third application comprises: a management application displaying (a) the third interface generated by the third application overlaid on top of (b) the second interface generated by the second application.

13. The system of claim 8, wherein displaying the second interface by the second application comprises: a management application concurrently displaying (a) the second interface generated by the second application with (b) the first interface generated by the first application.

14. The system of claim 8, wherein displaying the second interface by the second application comprises: the first application transferring control to the second application.

15. A method comprising:
    displaying, by a first application, a first interface comprising a first interface element corresponding to a first object in a plurality of objects;
    detecting a zoom-out command, received by the first application, requesting a zoom level for the first interface element;
    determining that the requested zoom level is less than a threshold;
    responsive to determining that the requested zoom level is less than the threshold:
    displaying, by a second application, a second interface comprising a plurality of interface elements respectively representing the plurality of objects;
    wherein at least one interface element in the plurality of interface elements was not displayed by the first application;
    wherein the method is performed by at least one device including a hardware processor.

16. The method of claim 15, wherein the first interface does not comprise any characteristics or user input elements associated with objects, in the plurality of objects, other than the first object.

17. The method of claim 15, further comprising:
    detecting a zoom-in command, received by the second application, to zoom in on a second interface element corresponding to a second object in the plurality of objects;
    determining that the zoom-in command exceeds the threshold;
    responsive to determining that the zoom-in command exceeds the threshold:
    displaying, by a third application, a third interface corresponding to the second object, the third application being different than the first application.

18. The method of claim 17, further comprising:
    prior to the third application displaying the third interface, selecting the third application, from a plurality of applications, based on an object type of the second object.

19. The method of claim 15, wherein displaying the second interface by the second application comprises: a management application concurrently displaying (a) the second interface generated by the second application with (b) the first interface generated by the first application.

20. The method of claim 15, wherein displaying the second interface by the second application comprises: the first application transferring control to the second application.

* * * * *